US010447632B2

(12) United States Patent
Kao et al.

(10) Patent No.: US 10,447,632 B2
(45) Date of Patent: Oct. 15, 2019

(54) FILTERING NOTIFICATIONS FROM A THIRD PARTY APPLICATION TO A USER OF A SOCIAL NETWORKING SYSTEM BASED ON AN ACTION OF THE USER

(71) Applicant: FACEBOOK, INC., Menlo Park, CA (US)

(72) Inventors: Wayne Kao, New York, NY (US); Ken Deeter, San Francisco, CA (US); Bo Zhang, San Francisco, CA (US); Charles Jolley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 235 days.

(21) Appl. No.: 15/060,059

(22) Filed: Mar. 3, 2016

(65) Prior Publication Data

US 2016/0191438 A1 Jun. 30, 2016

Related U.S. Application Data

(63) Continuation of application No. 13/844,720, filed on Mar. 15, 2013, now Pat. No. 9,306,888.

(51) Int. Cl.
*G06F 3/0481* (2013.01)
*H04L 12/58* (2006.01)
*G06F 3/0484* (2013.01)

(52) U.S. Cl.
CPC ............ *H04L 51/12* (2013.01); *G06F 3/0481* (2013.01); *G06F 3/04842* (2013.01); *H04L 51/32* (2013.01)

(58) Field of Classification Search
CPC ...................................... H04L 51/32

USPC ......................................................... 709/223
See application file for complete search history.

(56) References Cited

U.S. PATENT DOCUMENTS

| 8,615,514 | B1 * | 12/2013 | Fernandes | ........... | G06F 17/3089 |
| | | | | | 707/728 |
| 9,306,888 | B2 | 4/2016 | Kao | | |
| 2011/0113094 | A1 * | 5/2011 | Chunilal | ........... | G06F 17/30867 |
| | | | | | 709/204 |

(Continued)

OTHER PUBLICATIONS

Office action from U.S. Appl. No. 13/844,720, dated Oct. 3, 2014, 11 pages.

(Continued)

*Primary Examiner* — Hermon Asres
*Assistant Examiner* — Sibte H Bukhari
(74) *Attorney, Agent, or Firm* — Keller Jolley Preece (57) ABSTRACT

A method for filtering a notification being provided from an application to a user of a social networking system based on an action of the user is described. The method starts by receiving the notification from the application to the user. If the notification is a first notification sent from the application to the user, the notification is displayed to the user with (i) a prompting message that includes a selectable opt in image, and (ii) a selectable opt out image. The prompting message includes a request to opt in to receiving notifications from the application. If the notification is not the first notification sent from the application to the user, the method determines whether to display the notification to the user by determining whether the user previously opted in to notifications from the application and whether click-through rate (CTR) of notifications from the application is greater than CTR threshold.

20 Claims, 7 Drawing Sheets

(56) References Cited

U.S. PATENT DOCUMENTS

| | | | |
|---|---|---|---|
| 2012/0041822 A1* | 2/2012 | Landry | G06Q 30/0261 705/14.58 |
| 2014/0100923 A1* | 4/2014 | Strezo | G06Q 10/067 705/7.39 |
| 2014/0172995 A1* | 6/2014 | Deeter | H04L 51/32 709/206 |

OTHER PUBLICATIONS

Final Office action from U.S. Appl. No. 13/844,720, dated May 4, 2015, 12 pages.
Notice of Allowance from U.S. Appl. No. 13/844,720, dated Nov. 24, 2015, 8 pages.

* cited by examiner

FILTERING NOTIFICATIONS FROM A THIRD PARTY APPLICATION TO A USER OF A SOCIAL NETWORKING SYSTEM BASED ON AN ACTION OF THE USER

CROSS-REFERENCE TO RELATED APPLICATIONS

This application is a continuation of U.S. application Ser. No. 13/844,720, filed Mar. 15, 2013, which is hereby incorporated by reference.

FIELD

An embodiment of the invention relates generally to filtering the notifications being provided from a third party application to a user of a social networking system based on an action of the user.

BACKGROUND

Currently, numerous third-party applications may be used in social networking systems. These third-party applications include, for example, multi-player games (e.g., Farmville™ Cityville™ and Words with Friends™), applications linked to the user's blogs (e.g., Wordpress™) as well as applications related to other social networking websites (e.g., Pinterest™, Yelp™, Spotify™ and Turntable.fm™).

The challenge for the social networking systems that act as intermediaries between the user and the third-party applications is to ensure that important information from these applications be received by the user while preventing the user from being spammed or overloaded with unwanted communications.

SUMMARY

Once a user has downloaded and accepted the Terms of Service of a third-party application (hereinafter, "application"), the application may use the services of the social networking system to provide communications (hereinafter, "notifications") to the user. However, without properly filtering the communications to the user, there is great potential for abuse and spam from the applications looking to advertise to user and his connections ("friends").

One embodiment of the invention is a method for filtering the notifications being provided from a third party application to a user of a social networking system based on an action of the user. The method starts by receiving the notification from the application to the user. If the notification is a first notification sent from the application to the user, the notification is displayed to the user with (i) a prompting message that includes a selectable opt in image, and (ii) a selectable opt out image. The prompting message includes a request to opt in to receiving notifications from the application. If the notification is not the first notification sent from the application to the user, the method determines whether to display the notification to the user by determining whether the user previously opted in to notifications from the application and whether click-through rate (CTR) of notifications from the application is greater than CTR threshold.

Another embodiment of the invention is a non-transitory machine-readable storage medium having stored thereon instruction, when executed by a processor, causes the processor to filter the notifications being provided from a third party application to a user of a social networking system based on an action of the user.

In yet another embodiment of the invention, a social networking system filters a notification being provided from an application to a user of the social networking system based on an action of the user. The system includes a processor to execute the instructions stored in the memory of the system to cause the system to receive the notification from the application to the user and to display the notification to the user with (i) a prompting message with a selectable opt in image, and (ii) a selectable opt out image if the notification is a first notification sent from the application to the user. If the notification is not the first notification sent from the application to the user, the system determines whether to display the notification to the user.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

An online social networking system allows users to associate themselves and establish connections with other users of the social networking system. When two users become connected, they are said to be "connections," "friends," "contacts," or "associates" within the context of the social networking system. Generally being connected in a social networking system allows connected users access to more information about each other than would otherwise be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include but are not limited to messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files.

Users of social networking systems may interact with objects such as content items, user information, user actions (for instance communication made within the social networking system, or two users becoming connections), or any other activity or data within the social networking system. This interaction may take a variety of forms, such as by communicating with or commenting on the object; clicking a button or link associated with affinity (such as a "like" button); sharing a content item, user information or user actions with other users; downloading or merely viewing a content item; or by any other suitable means for interaction. Users of a social networking system may also interact with other users by connecting or becoming friends with them, by communicating with them, or by having common connections within the social networking system. Further, a user of a social networking system may form or join groups, or may become a fan of a fan page. Finally, a social networking system user may interact with content items, websites, other users or other information outside of the context of the social networking system's web pages that are connected to or associated with the social networking system. For instance, an article on a news website might have a "like" button that users of the social networking system can click on to express approval of the article. These interactions and any other suitable actions within the context of a social networking system may be recorded in social networking system data.

The social networking system maintains a user profile for each user. Any action that a particular member takes with respect to another member is associated with each user's profile, through information maintained in a database or other data repository. Such actions may include, for example, adding a connection to the other member, sending a message to the other member, reading a message from the other member, viewing content associated with the other member, attending an event posted by another member, among others. The user profiles may also describe characteristics, such as work experience, educational history, hobbies or preferences, location or similar data, of various users and include data describing one or more relationships between users, such as data indicating users having similar or common work experience, hobbies or educational history. Users can also post messages specifically to their profiles in the form of status updates. Users of a social networking system may view the profiles of other users if they have the permission. In some embodiments, becoming a connection of a user automatically provides the permission to view the user's profile.

The social networking system also attempts to deliver the most relevant information to a viewing user employing algorithms to filter the raw content on the network. Content may be filtered based on the attributes in a user's profile, such as geographic location, employer, job type, age, music preferences, interests, or other attributes, as well as based on the interests of the user with respect to another user who is related to the generated content (e.g., the user who performed an action that resulted in the content or information). Newsfeed stories may be generated to deliver the most relevant information to a user based on a ranking of the generated content, filtered by the user's affinity, or attributes. Similarly, social endorsement information may be used to provide social context for advertisements that are shown to a particular viewing user.

The social networking system also attempts to notify the user of important changes to content that are relevant to the user. For instance, the social networking environment may display a message ("notification") to the user when his friend posts on the user's profile or when a friend "likes" one of the user's posts. These notifications are examples of user-to-user notifications. The social networking environment may also provide notifications from a third party application ("application") to the user. Described in further detail below is a method of filtering these application-to-user notifications in the social networking system to provide the user with a better user experience.

Figure 1:
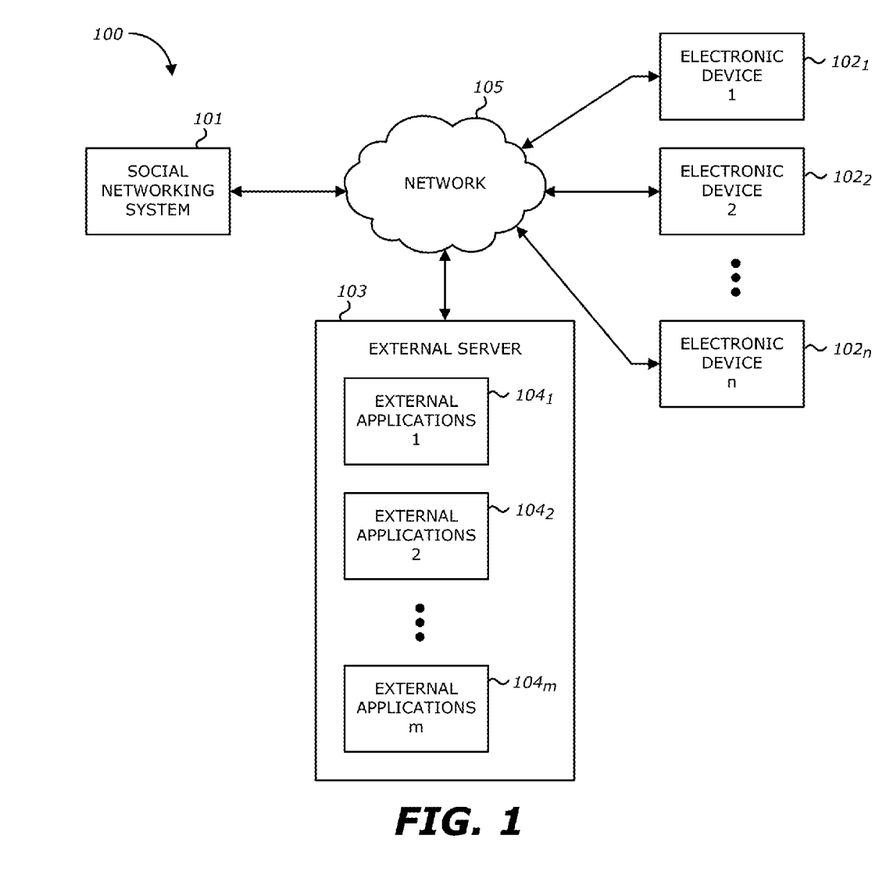
FIG. 1 shows a block diagram of an environment of a social networking system according to one embodiment of the invention.

FIG. 1 shows a block diagram of an environment of a social networking system according to one embodiment of the invention. The environment 100 in FIG. 1 illustrates a social networking system 101, a plurality of user electronic devices $102_1$-$102_n$ (n>1), and an external server 103 connected by a network 105. The network 105 may be a variety of different wired or wireless communications networks and protocols that is supported by the user electronic devices $102_1$-$102_n$. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN).

Users interact with the social networking system 101 using user electronic devices $102_1$-$102_n$, respectively. The user electronic devices $102_1$-$102_n$ may be, for example, a personal computer, a laptop computer, a mobile telephone communication device, a smartphone, or a tablet computer. The user electronic devices $102_1$-$102_n$ may communicate with the social networking system 101 via an application such as a web browser or native application. Typical interactions between the user electronic devices $102_1$-$102_n$ and the social networking system 101 include operations such as viewing profiles of other users of the social networking system 101, contributing and interacting with media items, joining groups, listing and confirming attendance at events, checking in at locations, liking certain pages, creating pages, and performing other tasks that facilitate social interaction.

The social networking system also provides application developers with the ability to create applications that extend the functionality of the social networking system to provide new ways for users to interact with each other. For example, an application may provide an interesting way for a user to communicate with other users, or allow users to participate in multiplayer games, or collect some interesting information such as news related to a specific topic and display it to the member periodically. To the applications, the social networking system resembles a platform. In some embodiments, external third party applications $104_1$-$104_m$ (m>1) running on the external server 103 interact with the social networking system 101. In other embodiments, a version of the external applications $104_1$-$104_m$ is downloaded and installed on the user electronic device $102_1$-$102_n$. In other embodiments, these applications $104_1$-$104_m$ are stored and run on the social networking system 101.

Once a user has downloaded and accepted the Terms of Service of an application, the application may also use the services of the social networking system to provide notifications to the user. These notifications may include actions that have been taken by the user's friend in the application and calls to action the user (e.g., Lin N. has played the word "spiffy" in Words with Friends™. It's your turn.), advertisements from the application to the user (e.g., If you like Farmville™, you may also like Cityville™), and invitations from friends to use the application (e.g., Lin N. has sent you a request in Words with Friends™).

Figure 2:
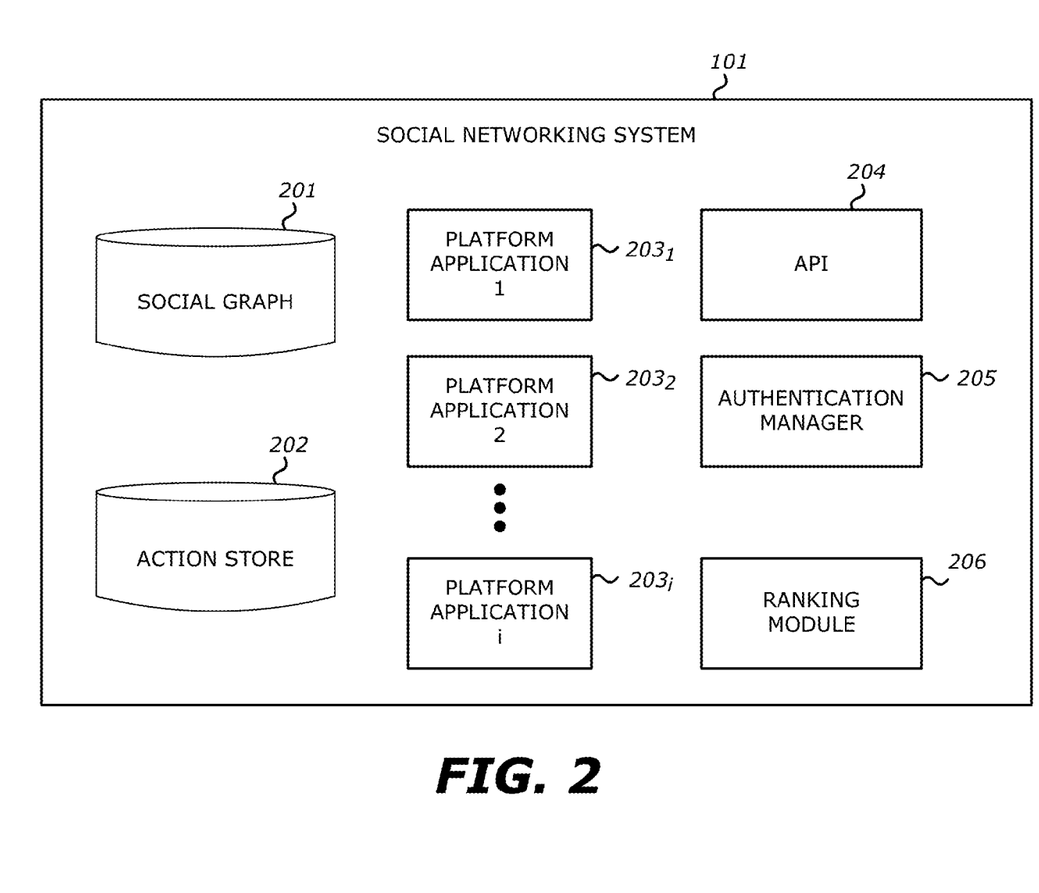
FIG. 2 shows a block diagram of the social networking system according to one embodiment of the invention.

FIG. 2 shows a block diagram of a social networking system according to one embodiment of the invention. As shown in FIG. 2, the social networking system 101 may comprise a number of storage components used to store information about its users and objects represented in the social networking environment, as well as the relationships among the users and objects. This may take the form of a social graph. The social networking system 101 may additionally comprise components to enable several actions to user devices of the system, as described above.

For instance, in one embodiment, the social graph 201 stores the connections that each user has with other users of the social networking system 101. The social graph 201 may also store second-order connections, in some embodiments. The connections may thus be direct or indirect. In one embodiment, the action store 202 stores actions that have been performed by the users of the social networking system 101, along with an indication of the time associated with those actions and references to any objects related to the actions. The action store 202 may also store actions that have been performed by the users in third party applications $104_1$-$104_m$. The social graph 201 and the action store 202 may utilize one or more different types of storage such as hard disk drive storage, other nonvolatile memory, and volatile memory such as dynamic random access memory.

The social networking system 101 may also include platform applications $203_1$-$203_i$ (i>1), which are applications that operate within the social networking system 101 but may be provided by third parties other than an operator of the social networking system 101. For instance, platform applications $203_1$-$203_i$ may include social games (e.g., Words with Friends™ Farmville™), messaging services (e.g., IMO™, Whatsapp™), and any other application that uses the social platform provided by the social networking system 101.

The authentication manager 205 authenticates a user on user device $102_1$ as being a registered user of the social networking system 101. The authentication manager 205 allows a user to log into the social networking system 101 from any user device $102_1$-$102_n$ that has an application supporting the social networking system 101. The application programming interface (API) 204 works in conjunction with the authentication manager 205 to validate users via external third party applications $104_1$-$104_m$ (m>1).

In some embodiments, the social networking system 101 also includes a processor (not shown) that is coupled to the storage components (e.g., social graph 201, the action store 202), the platform applications $203_1$-$203_i$, the API 204, and the authentication manager 205. The processor may be a microprocessor, a microcontroller, a digital signal processor, or a central processing unit. The term "processor" may refer to a device having two or more processing units or elements, e.g. a CPU with multiple processing cores. The processor may be used to control the operations of social networking system 101 by executing software instructions or code stored in the storage components.

In some embodiments, external third party applications $104_1$-$104_m$ running on the external server 103 interact with the social networking system 101 via API 204. The third party applications $104_1$-$104_m$ can perform various operations supported by the API 204, such as enabling the application to send a user a notification through the social networking system 101. The ranking module 206 included in social networking system 101 ranks the notifications generated by the applications $104_1$-$104_m$ according to selected factors. These selected factors may be user-specific factors that take into account whether the user has engaged with the application $104_1$ within a predetermined timeframe (e.g. within the last month) and the frequency at which the user has engaged with the notifications from the application $104_1$ within a period of time (e.g., daily, weekly, or monthly). This period of time may be a rolling window. In some embodiments, if the user has not engaged with the application $104_1$ in the predetermined timeframe, the ranking module 206 will allocate a low importance to the notifications from the application $104_1$ and prevent the application $104_1$ from sending notifications to the user. In other embodiments, the frequency at which the user has engaged with the notifications from the application $104_1$ is based a click-through rate (CTR) which is the rate at which a user or users selects or clicks the notifications from the application $104_1$ within a period of time. Accordingly, the CTR may be calculated on a clicks-per-notifications being generated by the application $104_1$ to the user. The ranking module 206 calculates the CTR for application $104_1$ and determines whether the calculated CTR is less than a threshold CTR. This calculation may be on a system wide basis for all users of the application, on a filtered basis (for example, users of the application that meet certain requirements), or on an individual user basis. If the calculated CTR is less than the threshold CTR, the ranking module 206 will allocate a low importance to the notifications from the application $104_1$ and prevent the application $104_1$ from sending notifications to the user. In other embodiments, the frequency at which the user has engaged with the notifications from the application $104_1$ is based the rate at which the user engages with the notifications being generated from the application $104_1$ (e.g., like the notification or photos and/or comments included in the notifications, share the notification, bookmarking the application $104_1$ via the notification, playing the application $104_1$) within a period of time.

Figure 3:
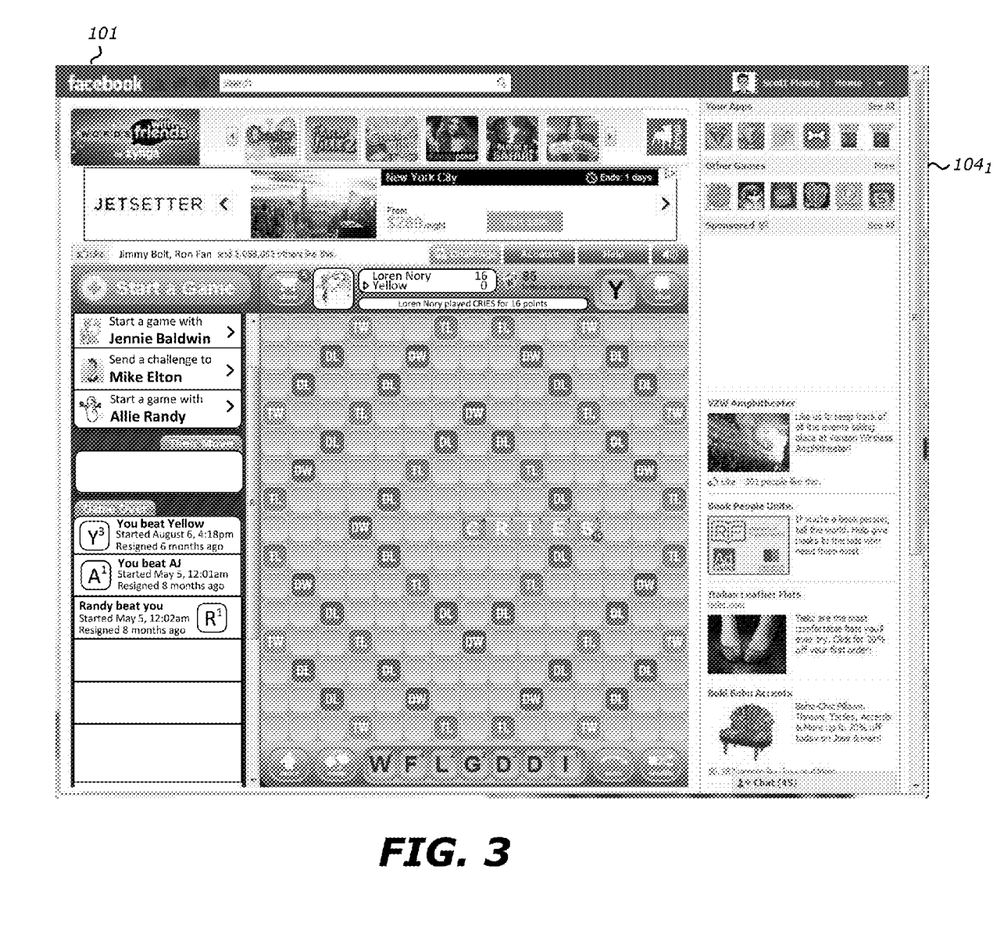
FIG. 3 shows a screenshot of an exemplary third party application used in the social networking system according to one embodiment of the invention.
Figure 4A:
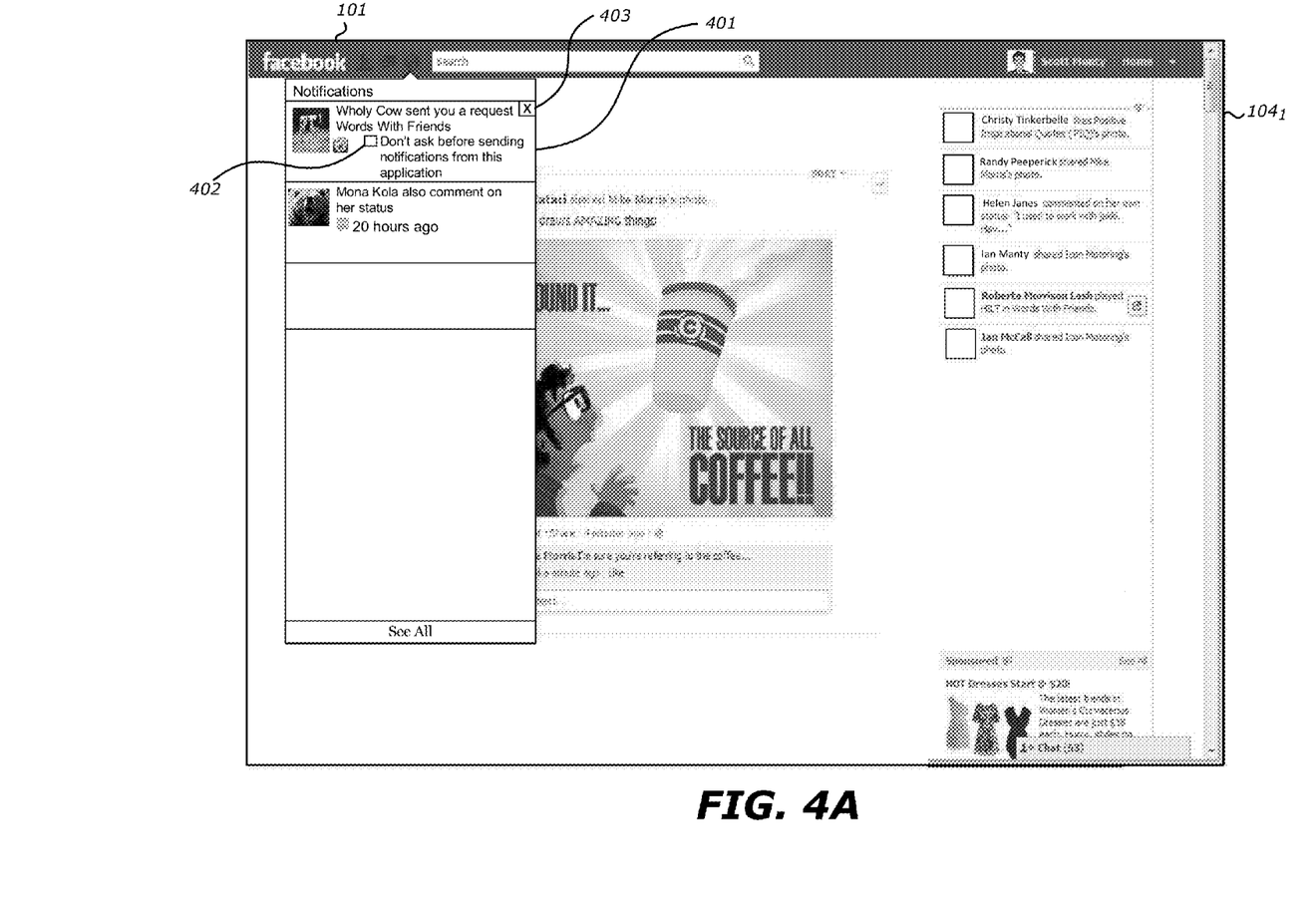
FIGS. 4A-4B show screenshots of exemplary notifications in the social network system to the user from the third-party applications according to embodiments of the invention.
Figure 4B:
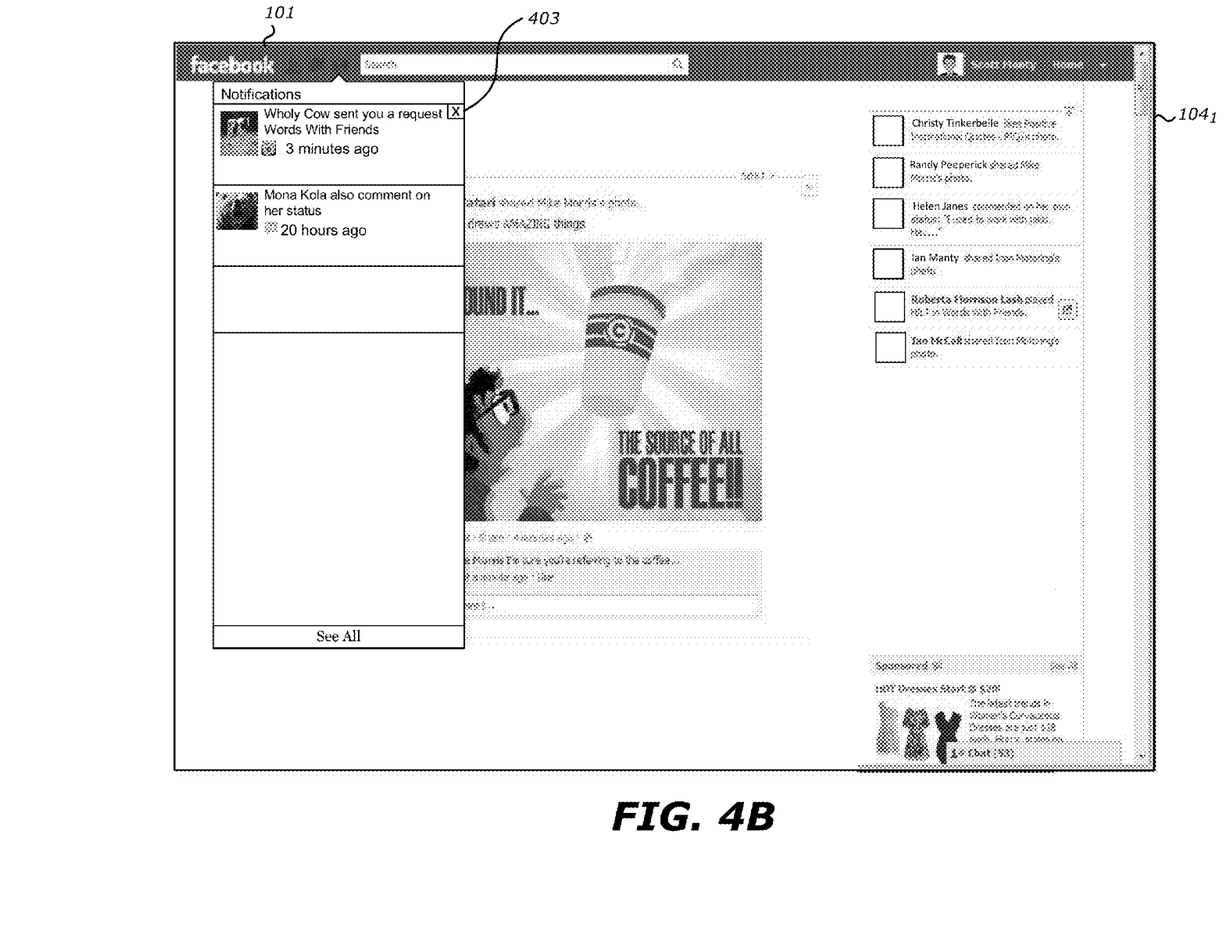

FIG. 3 shows a screenshot of an exemplary third party application used in the social networking system according to one embodiment of the invention. As shown in FIG. 3, an application may be a multiplayer game like Words with Friends™ that allows a user and his friend to take turns building words using tiles in a crossword puzzle style on a game board. FIGS. 4A-B shows screenshots of exemplary notifications in the social network system to the user according to one embodiment of the invention. As illustrated in FIG. 4A, when the application $104_1$ sends a first notification to the user, the social networking system 101 allows the first notification to be provided to the user but includes a prompting message 401 with the first notification. In FIG. 4A, the first notification and the prompting message 401 appears in a notification ticker of the social networking system 101's user interface. The notification ticker may be a dropdown window that includes a list of the notifications from the social networking system 101, applications $104_1$-$101_m$, as well as the user's friends. The prompting message 401 specifically prompts the user whether he wishes to receive notifications (or a type of notification) from the application $104_1$. The type of notification being a subset of all notifications from the application $104_1$. The prompting message 401 includes an image or text or any suitable mechanism 402 that may be selected by the user to opt in to receiving a type of notification from the application $104_1$ or from all notifications from the application $104_1$. As illustrated in FIG. 4A, the opt in image 402 is an image of a box that may be clicked to generate an X in the box to indicate that the user has opted in to receiving the type of notification or from all notifications from the application $104_1$. In some embodiments, if the user does not select the opt in image or text 402, the social networking system 101 will display the subsequent number of notifications from the application $104_1$ to user with the prompting message 401. The subsequent number of notifications may be up to three subsequent notifications or up to five subsequent notifications. If the user does not select the opt in image or text 402 after the subsequent number of notifications, the social networking system 101 presumes that user has opted in to notifications from the application $104_1$. In another embodiment, the system 101 may allow the first notification to be provided to the user but may only include a prompting message 401 in the second notification from the application $104_1$ to the user.

The first notification also includes an image or text or any suitable mechanism 403 that may be selected by the user to opt out of receiving a type of notification or all notifications from the application $104_1$. The opt out image or text 403 may be an image of an X. In one embodiment, when the image or text 403 is clicked by the user, an image may be displayed that provides the user with opt out options. The options may include opting out of all notifications from the application $104_1$ or opting out of a type of notification from the application $104_1$. For instance, if the first notification from the Farmville™ application is regarding "watering vegetables", this first notification is displayed to the user with the prompt message 401 and opt in image or text 402 as well as the opt out image or text 403. If the user clicks on the opt out image 403, the user is provided with the options to opt out of all notifications from Farmville™ or to opt out of notifications regarding "vegetables". As illustrated in FIG. 4B, once a user has opted in to receiving notifications or a type of notification from the application $104_1$ or has ignored the prompting message 401 for a predetermined number of times that the system 101 presumes that the user has opted in to receiving the notifications from the application $104_1$, the notifications from the application $104_1$ appear in the notification ticker and include the opt out image or text 403. As shown in FIG. 4B, the post opt in notifications do not include the prompting message 401. Accordingly, the users that have opted in to receiving notifications from Farmville™ can use the opt out image or text 403 to opt out of a type of notification (e.g., notifications about "vegetables") or all notifications from Farmville™.

The notifications from the application $104_1$ to the user that contain a simple text message attributed to the application are called unstructured notifications. This text message may include free form text. For instance, Farmville™ can send "Farmville™ Your farm is on fire!" as an unstructured notification. The application $104_1$ developers may also use the system 101's templates to create the notifications. In one embodiment, the developers may send the message, image, or other data that the developers want to include in a notification. The developers may also provide variables (e.g., user identification, user's connection identification, etc.). The system 101 may use the data and the variables received from the developers and may substitute the variables with actual user data (e.g., the user's name, the connection's name, etc.) to generate the notification based on the templates. Thus, the templates may allow the system 101 to personalize the notifications to the users such that the notification is more relevant to each user receiving the notifications. In other embodiments, the templates are pre-approved and provided by the system 101 to create the notifications. In some embodiments, the system 101 may use a different template for each type of notification. Based on the user's opt in and opt out selections for each type of notification, the system 101 can determine which template is not relevant to the user. Using the templates, the system 101 may also aggregate the notifications provided by the application $104_1$ such that the system 101 displays all the notifications pertaining to one type of notification as an aggregated notification of that type. For example, if Farmville™ sends the notifications "Lin N. watered your vegetables in Farmville™", "Ryan E. watered your vegetables in Farmville™", and "Justin M. watered your vegetables in Farmville™" to the social networking system 101, the system 101 may aggregate the notifications as "Lin N. and 2 other friends watered your vegetables in Farmville™." These notifications that are generated as a result of an action from a friend in the application $104_1$ are called structured notifications.

Since a user may access the system 101 via a plurality of electronic devices $102_1$-$102_n$, in some embodiments, the system 101 determines on which electronic device $102_1$-$102_n$ (e.g., laptop, smart phone, tablet computer) the user was last active and pushes or sends the notification to that electronic device. If the user does not acknowledge the notification within a period of time, the system 101 then sends the notification to the next electronic device on which the user was last active. In one embodiment, the system 101 may provide a notification from the application $104_1$ to each of the electronic devices $102_1$-$102_n$ used by the user to access the system 101 or used by the user to interact with application $104_1$. In another embodiment, the system 101 determines which of the user's electronic devices $102_1$-$102_n$ includes application $104_1$ installed thereon. In this embodiment, the system 101 provides the notification from application $104_1$ only to the user's electronic devices $102_1$-$102_n$ that have the application $104_1$ installed thereon.

In one embodiment, as shown in FIG. 4B, the notification ticker includes the new notifications and the old notifications that have already been seen or selected by the user. In one embodiment, the new notifications are highlighted and displayed with a diamond and the old notifications are not highlighted and are displayed without the diamond. As discussed above, when users of the social networking system 101 click on a notification, the ranking module 206 in the social networking system 101 calculates a click-through rate (CTR) of the notifications from the application $104_1$ to the users. The CTR may take into account clicks from all users system-wide to generate a system-wide CTR for the notifications from the application. In one embodiment, granularity may be obtained by calculating a CTR that takes into account clicks from users having similar demographics. In another embodiment, the ranking module 206 calculates the frequency of clicks by the specific user on notifications sent from the application to obtain a CTR that is user specific as well as application $104_1$ specific. The CTR may also be based on the type of notification (e.g., notifications about "vegetables") such that if a user is found to click on this type of notification at a rate that falls below a threshold CTR, the social networking system 101 blocks this type of notification from appearing in the notification ticker. The CTR may also be an aggregated CTR based on all the notifications from an application $104_1$ (e.g., all notifications from Farmville™). If the user is found to infrequently click on notifications from the application $104_1$ such that the CTR that is user and application $104_1$ specific falls below a threshold aggregated CTR, the social networking system 101 blocks all notifications from the application $104_1$. The threshold aggregated CTR may be selected to be sensitive to spam as well as sensitive to the user's preferences regarding the specific applications. In this embodiment, the system 101 is able to tailor the notifications being provided to each user. For instance, while the system-wide CTR indicates that users like receiving Farmville™ notifications, the user-specific CTR may indicate that this user infrequently clicks on Farmville™ notifications. Accordingly, the system 101 may block Farmville™ notifications from being displayed to this user. The ranking module 206 of the system 101 may also assess the CTR based on the type of notification and the CTR based on all aggregated notifications from the application $104_1$ on daily, weekly, or monthly basis. In some embodiments, the social networking system 101 allows applications $104_1$-$104_m$ that are falling below the threshold CTR to purchase a lower threshold CTR or to purchase the opportunity to send notifications to the user. The following embodiments of the invention may be described as a process, which is usually depicted as a flowchart, a flow diagram, a sequence diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
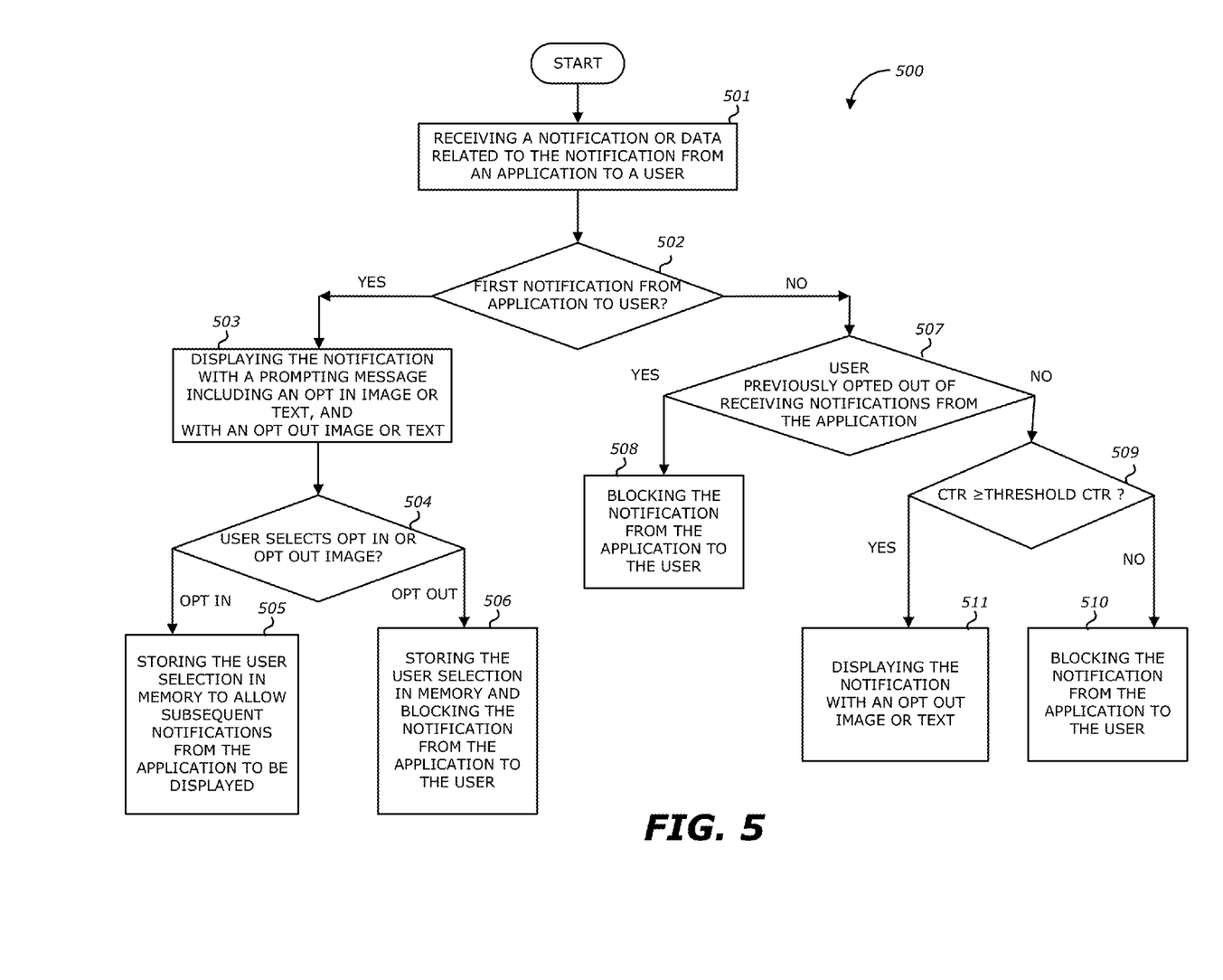
FIG. 5 illustrates a flow diagram of an example method of filtering the notifications being provided from a third party application to a user of a social networking system based on an action of the user according to one embodiment of the invention.

FIG. 5 illustrates a flow diagram of an example method of filtering the notifications being provided from a third party application to a user of a social networking system based on an action of the user according to one embodiment of the invention. The method 500 starts with the social networking system 101 receiving a notification or data related to the notification from the application to the user (Block 501). In one embodiment, the application generates the notification and sends the notification to the system 101. In other embodiments, the system 101 receives data related to the notification such as content to be included in the notification (e.g., application name, the name of friends that have performed an action in the application, the action being performed in the application, etc.). In one embodiment, the system 101 hosts the application such that it receives data related to the notification when an application to user notification is to be sent. At Block 502, the system 101 determines whether the notification received is the first notification from this application to the user. If the notification is the first notification, the system 101 displays the notification to the user with (i) a prompting message with a selectable opt in mechanism. The notification may also include (ii) a selectable opt out mechanism. For instance, the notification being displayed may be the notification illustrated in FIG. 4A. The prompting message includes a request to opt in to receiving notifications from the application (Block 503). In Block 504, the system 101 determines if the user selected the selectable opt in mechanism or the selectable opt out mechanism. If the user opts in (Block 505), the system 101 stores in memory that the user has opted in to receiving notifications from the application. In one embodiment, an external third party application host may be communicatively coupled to the system 101 such that, in Block 505, the system 101 signals to the host to store in the host's memory that the user opted in to receiving notifications from the application. In some embodiments, if the user ignores the notification without opting in or out, the system will display a subsequent notification from the application to the user with the prompting message again, as illustrated in FIG. 4A for instance. The system 101 may also presume that the user has opted in to receiving notifications from the application if the user ignores a predetermined number (e.g., five) of notifications that include the prompting message. If the user opted out in Block 504, the system 101 stores in memory that the user opts out from receiving notifications from the application and blocks the application from sending notifications to the user (Block 506). In one embodiment, in Block 506, the system 101 signals to the host to store in the host's memory that the user opted out of receiving notifications from the application. In some embodiments, when the user opts out in Block 504, the system 101 displays selectable opt out options that include an option to opt out of all notifications from the application or an option to opt out of a type of notification from the application. In this embodiment, the all notifications from the application to the user are blocked if the user selected the option to opt out of all notifications from the application or blocks only the type of notification from the application to user if the user selected the option to opt out of the type of notification from the application.

Referring back to Block 502, if the system determines that the received notification from the application is not the first notification from the application to the user, the system 101 determines whether the user has previously opted out of receiving notifications from this application (Block 507). The system 101 blocks the notifications from the application to the user if the user has opted out of receiving notifications from this application (Block 508). If the user did not opt out of receiving notifications from this application, the system 101 determines whether the CTR for notifications from the application to the user is greater than or equal to a threshold CTR (Block 509). The threshold CTR may be set by a system administrator or other entity, or be a predefined value. CTR may be kept system wide or based on demographics (such as location, age group, etc.) that are common with the user. The CTR may also be user as well as application specific. If the CTR for the notifications from the application is less than the threshold CTR (potentially indicating an unpopular application that users do not use), the system 101 blocks all notifications from the application to the user (Block 510) unless the user later opts in, but if the CTR for the notification from the application is greater than or equal to the threshold CTR, the system 101 displays the notification from the application to the user with the selectable opt out mechanism (Block 511). For instance, the notification being displayed at Block 511 may be the notification in FIG. 4B. In one embodiment, the CTR for notifications from the application includes a CTR for a type of notification from the application and the threshold CTR is a threshold CTR for the type of notification from the application. In this embodiment, the system 101 blocks types of notifications from the application that do not reach the threshold CTR set for that type of notification. Accordingly, the system 101 filters the types of notifications from an application that are not relevant to the user while allowing the user to receive other types of notifications from the application that are relevant to the user (e.g., the types of notification that are getting clicked by the user). In FIG. 5, while the user may have previously opted in or out of receiving notifications from the application $104_1$, the user may change his preferences regarding the notifications at any time. For instance, while the user has previously opted in to receiving a notification at Block 504 such that the selection is stored in Block 505, the user may decide to opt out once he receives the notification at Block 511 by selecting the opt out image or text. Similarly, the user that has previously opted out of receiving notifications from application $104_1$, may opt in to receiving the notifications at any time. For instance, in one embodiment, the user may alter his opt out preference to an opt in preference with regards to this application $104_1$ in a settings menu.

Figure 6:
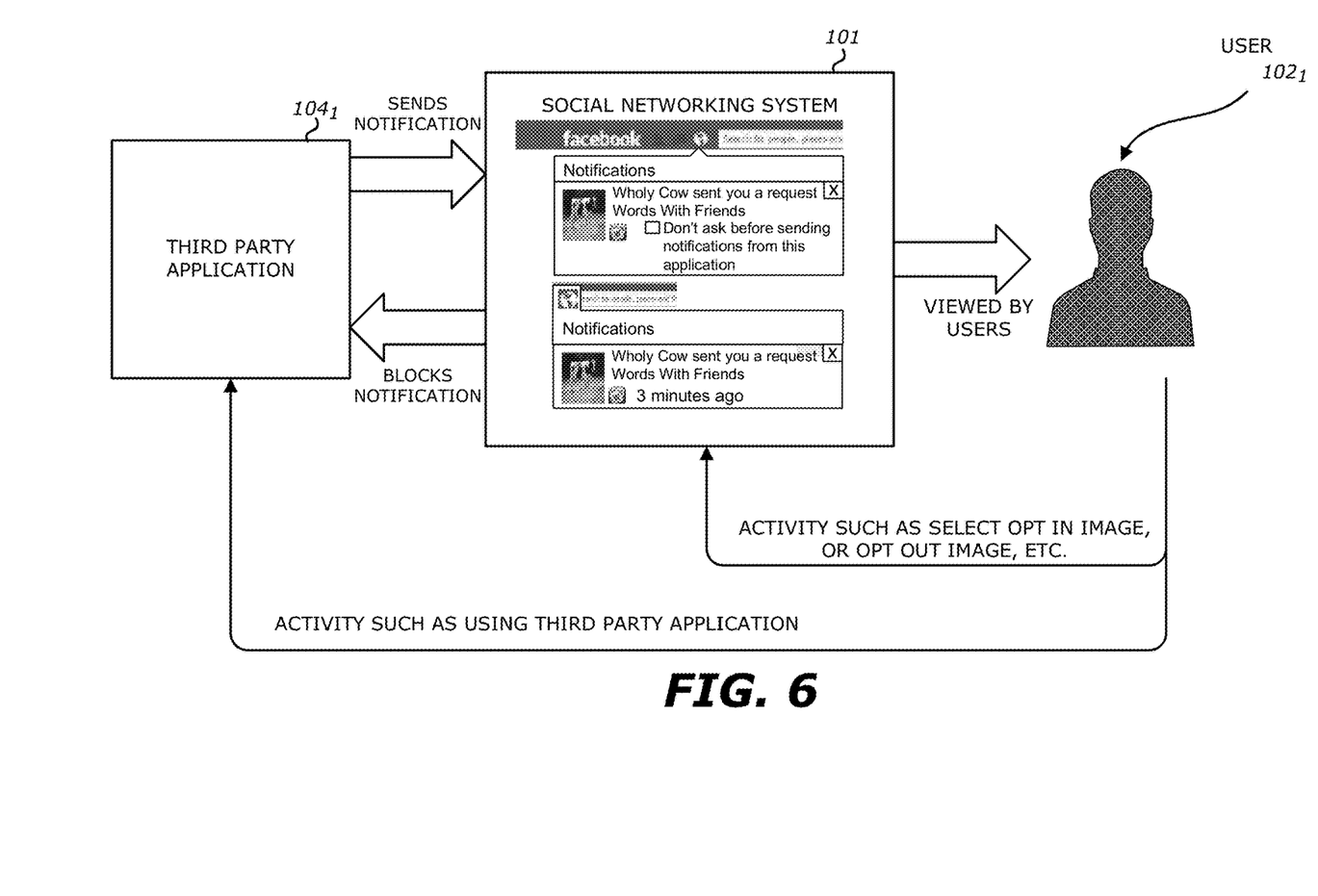
FIG. 6 shows a block diagram illustrating the example method of filtering the notifications being provided from a third party application to a user of a social networking system based on an action of the user according to one embodiment of the invention.

FIG. 6 shows a block diagram illustrating the example method of filtering the notifications being provided from a third party application to a user of a social networking system based on an action of the user according to one embodiment of the invention. As shown in FIG. 6, the third party application $104_1$ which is executed by the external server 103 or by the user's electronic device $102_1$ transmits a notification to the social networking system 101 which displays the notification to be viewed by the user on his electronic device $102_1$. For instance, the notification may be posted in the notification ticker. If the user clicks on the notification, the social networking system 101 records the click to calculate the CTR for a type of notification or the CTR for all notifications from the application $104_1$. If the user clicks on the opt out image or text 403 on the notification, the social networking system 101 stores in memory (action store 202) that the user has opted out of receiving notifications from the application $104_1$ or a type of notification from the application $104_1$ and blocks the notifications from the application $104_1$ to the user accordingly.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving a notification associated with a notification type from a third party application to be provided to a user of a communication system;
  determining a ranking of notifications associated with the notification type from the third party application,
    wherein the ranking is determined based on:
      whether a rate of clicks the user performs, within a period of time, per notification associated with the notification type generated by the third party application meets a threshold rate, wherein the threshold rate represents a threshold rate of clicks performed per notification associated with the notification type generated by the third party application; and
      whether the user has engaged with the third party application within the period of time; and
    wherein determining the ranking of notifications associated with the notification type from the third party application comprises determining a negative ranking for the notifications associated with the notification type from the third party application when the rate of clicks the user performs, within the period of time, per notification associated with the notification type generated by the third party application is less than the threshold rate and the user has not engaged with the third party application within the period of time; and
  determining whether to block the notification based on the determined ranking of the notifications associated with the notification type from the third party application, wherein determining whether to block the notification comprises blocking the notification based on the determined negative ranking of the notifications associated with the notification type from the third party application.

2. The method of claim 1, wherein the threshold rate represents a threshold rate of clicks one or more users performed per notification associated with the notification type generated by the third party application within a predetermined timeframe.

3. The method of claim 1, further comprising:
   prompting the user to opt in to receiving the notifications associated with the notification type from the third party application; and
   determining to not block the notification when the user opts in to receive notifications associated with the notification type.

4. The method of claim 3, further comprising providing the notification to the user, wherein the notification comprises a selectable image to opt out of receiving notifications from the third party application.

5. The method of claim 4, further comprising:
   providing a plurality of selectable opt out options in response to a user selection of the selectable image, wherein the selectable opt out options include an option to opt out of all notifications from the third party application and an option to opt out of a type of notification from the third party application, the type of notification being a subset of all notifications from the third party application.

6. The method of claim 1, further comprising:
   determining a positive ranking for the notifications associated with the notification type from the third party application when the rate of clicks the user performs, within the period of time, per notification associated with the notification type generated by the third party application is less than the threshold rate and the user has engaged with the third party application within the period of time; and
   providing the notification to the user based on the determined positive ranking of the notifications associated with the notification type.

7. The method of claim 1, wherein the threshold rate represents a threshold rate of clicks one or more users performed per notification associated with the notification type generated by the third party application within a predetermined timeframe, wherein the one or more users are filtered based on demographics corresponding to demographics of the user of the communication system.

8. A non-transitory computer-readable medium storing instructions that, when executed by one or more processors in a processing device, cause the processing device to:
   receive a notification associated with a notification type from a third party application to be provided to a user of a communication system;
   determine a ranking of notifications associated with the notification type from the third party application, wherein the ranking is determined based on:
      whether a rate of clicks the user performs, within a period of time, per notification associated with the notification type generated by the third party application meets a threshold rate, wherein the threshold rate represents a threshold rate of clicks performed per notification associated with the notification type generated by the third party application; and
      whether the user has engaged with the third party application within the period of time; and
      wherein determining the ranking of notifications associated with the notification type from the third party application comprises determining a negative ranking for the notifications associated with the notification type from the third party application when the rate of clicks the user performs, within the period of time, per notification associated with the notification type generated by the third party application is less than the threshold rate and the user has not engaged with the third party application within the period of time; and
   determine whether to block the notification based on the determined ranking of the notifications associated with the notification type from the third party application, wherein determining whether to block the notification comprises blocking the notification based on the determined negative ranking of the notifications associated with the notification type from the third party application.

9. The non-transitory computer-readable medium of claim 8, wherein the threshold rate represents a threshold rate of clicks one or more users performed per notification associated with the notification type generated by the third party application within a predetermined timeframe.

10. The non-transitory computer-readable medium of claim 8, further storing instructions that, when executed by the one or more processors, cause the processing device to:
    prompt the user to opt in to receiving the notifications associated with the notification type from the third party application; and
    determine to not block the notification when the user opts in to receive notifications associated with the notification type.

11. The non-transitory computer-readable medium of claim 10, further storing instructions that, when executed by the one or more processors, cause the processing device to provide the notification to the user, wherein the notification comprises a selectable image to opt out of receiving notifications from the third party application.

12. The non-transitory computer-readable medium of claim 11, further comprising instructions that, when executed by the one or more processors, cause the processing device to:
    provide a plurality of selectable opt out options in response to a user selection of the selectable image, wherein the selectable opt out options comprise an option to opt out of all notifications from the third party application and an option to opt out of a type of notification from the third party application, the type of notification being a subset of all notifications from the third party application.

13. The non-transitory computer-readable medium of claim 8, further storing instructions that, when executed by the one or more processors, cause the processing device to:
    determine a positive ranking for the notifications associated with the notification type from the third party application when the rate of clicks the user performs, within the period of time, per notification associated with the notification type generated by the third party application is less than the threshold rate and the user has engaged with the third party application within the period of time; and
    provide the notification to the user based on the determined positive ranking of the notifications associated with the notification type.

14. The non-transitory computer-readable medium of claim 8, wherein the determined ranking of the notifications associated the notification type is specific to the user of the communication system.

15. An apparatus comprising:
a processing device; and
a memory coupled to the processing device, the memory storing instructions that, when executed by the processing device, cause the apparatus to:
receive a notification associated with a notification type from a third party application to be provided to a user of a communication system;
determine a ranking of notifications associated with the notification type from the third party application, wherein the ranking is determined based on:
whether a rate of clicks the user performs, within a period of time, per notification associated with the notification type generated by the third party application meets a threshold rate, wherein the threshold rate represents a threshold rate of clicks performed per notification associated with the notification type generated by the third party application; and
whether the user has engaged with the third party application within the period of time; and
wherein determining the ranking of notifications associated with the notification type from the third party application comprises determining a negative ranking for the notifications associated with the notification type from the third party application when the rate of clicks the user performs, within the period of time, per notification associated with the notification type generated by the third party application is less than the threshold rate and the user has not engaged with the third party application within the period of time; and
determine whether to block the notification based on the determined ranking of the notifications associated with the notification type from the third party application, wherein determining whether to block the notification comprises blocking the notification based on the determined negative ranking of the notifications associated with the notification type from the third party application.

16. The apparatus of claim 15, wherein the threshold rate represents a threshold rate of clicks one or more users performed per notification associated with the notification type generated by the third party application within a predetermined timeframe.

17. The apparatus of claim 15, further storing instructions that, when executed by the processing device, cause the apparatus to:
determine a positive ranking for the notifications associated with the notification type from the third party application when the user has engaged with the third party application within the period of time; and
provide the notification to the user based on the determined positive ranking of the notifications associated with the notification type.

18. The method of claim 1, further comprising:
receiving an additional notification associated with an additional notification type from the third party application to be provided to the user of the communication system;
determining a negative ranking for additional notifications associated with the additional notification type from the third party application when an additional rate of clicks the user performs, within an additional period of time, per notification associated with the additional notification type is less than an additional threshold rate; and
blocking the additional notification based on the determined negative ranking for the additional notifications associated with the additional notification type from the third party application.

19. The non-transitory computer-readable medium of claim 8, further storing instructions that, when executed by the one or more processors, cause the processing device to:
receive an additional notification associated with an additional notification type from the third party application to be provided to the user of the communication system;
determine a negative ranking for additional notifications associated with the additional notification type from the third party application when an additional rate of clicks the user performs, within an additional period of time, per notification associated with the additional notification type is less than an additional threshold rate; and
block the additional notification based on the determined negative ranking for the additional notifications associated with the additional notification type from the third party application.

20. The apparatus of claim 15, further storing instructions that, when executed by the processing device, cause the apparatus to:
receive an additional notification associated with an additional notification type from the third party application to be provided to the user of the communication system;
determine a negative ranking for additional notifications associated with the additional notification type from the third party application when an additional rate of clicks the user performs, within an additional period of time, per notification associated with the additional notification type is less than an additional threshold rate; and
block the additional notification based on the determined negative ranking for the additional notifications associated with the additional notification type from the third party application.

* * * * *